United States Patent
Sabet et al.

(10) Patent No.: US 10,608,975 B2
(45) Date of Patent: Mar. 31, 2020

(54) METHODS AND SYSTEMS FOR DELAYING MESSAGE NOTIFICATIONS

(71) Applicant: COMCAST CABLE COMMUNICATIONS, LLC, Philadelphia, PA (US)

(72) Inventors: Amman Sabet, Philadelphia, PA (US); Christopher Hungate, Royersford, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 15/473,063

(22) Filed: Mar. 29, 2017

(65) Prior Publication Data

US 2018/0287985 A1 Oct. 4, 2018

(51) Int. Cl.
| | | |
|---|---|---|
| *H04W 4/12* | (2009.01) | |
| *H04W 4/20* | (2018.01) | |
| *H04L 12/58* | (2006.01) | |
| *H04M 1/725* | (2006.01) | |

(52) U.S. Cl.
CPC .............. *H04L 51/20* (2013.01); *H04L 51/24* (2013.01); *H04L 51/26* (2013.01); *H04M 1/72555* (2013.01); *H04W 4/12* (2013.01)

(58) Field of Classification Search
CPC ... G06F 15/16; G06F 17/30858; H04N 21/41; H04N 21/845; H04N 21/472; H04N 21/4788; H04N 21/235; H04N 21/81; H04N 21/858; H04N 21/6587; H04N 21/4334; H04N 21/47217; H04N 21/233; H04N 21/47202; H04N 21/4583; H04N 21/2347; H04N 21/44004; H04L 67/10; H04L 67/22; H04L 67/306; H04L 12/58; H04L 29/06; H04L 29/08; H04L 51/32; H04L 65/60; H04L 51/20; H04L 51/26; H04L 65/4015; G06K 9/00288; H04W 4/12
See application file for complete search history.

(56) References Cited

U.S. PATENT DOCUMENTS

| | | | |
|---|---|---|---|
| 7,606,586 B2 | 10/2009 | Kim | |
| 8,364,122 B2 | 1/2013 | Febonio et al. | |
| 2006/0234696 A1* | 10/2006 | Cho | H04M 1/72547 455/424 |
| 2014/0032636 A1* | 1/2014 | Nelson | H04N 21/2343 709/203 |
| 2014/0051403 A1 | 2/2014 | Christensen | |

(Continued)

FOREIGN PATENT DOCUMENTS

CN 103596152 2/2014

*Primary Examiner* — Khawar Iqbal
(74) *Attorney, Agent, or Firm* — Ballard Spahr LLP

(57) ABSTRACT

Methods and systems are provided for delayed message notification associated with a content item. The system can receive a notification from a first user and intended for a second user, and can comprise a message, a content identifier, and a timestamp indicating a relative time within a content item associated with the content identifier. The system can transmit, to a device associated with the second user, a portion of the notification. In one implementation, the system can receive an indication that the second user's device is presenting the content item, and cause the message to be presented to the second.

20 Claims, 9 Drawing Sheets

(56) References Cited

U.S. PATENT DOCUMENTS

| | | | |
|---|---|---|---|
| 2015/0020091 A1* | 1/2015 | Roberts | G11B 27/28 |
| | | | 725/28 |
| 2015/0086180 A1* | 3/2015 | Pan | H04N 21/47214 |
| | | | 386/241 |
| 2015/0215382 A1* | 7/2015 | Arora | H04N 21/4126 |
| | | | 382/118 |
| 2016/0234553 A1* | 8/2016 | Hampson | H04N 21/458 |
| 2017/0041677 A1* | 2/2017 | Anderson | H04N 21/47205 |
| 2017/0289619 A1* | 10/2017 | Xu | H04N 21/251 |
| 2017/0324830 A1* | 11/2017 | Roberts, Jr. | H04L 65/4084 |
| 2018/0007099 A1* | 1/2018 | Ein-Gil | H04L 63/08 |
| 2018/0077096 A1* | 3/2018 | DeMattei | H04L 51/10 |
| 2018/0181566 A1* | 6/2018 | Lee | G06F 21/6227 |
| 2019/0124021 A1* | 4/2019 | DeMattei | H04L 51/04 |

* cited by examiner

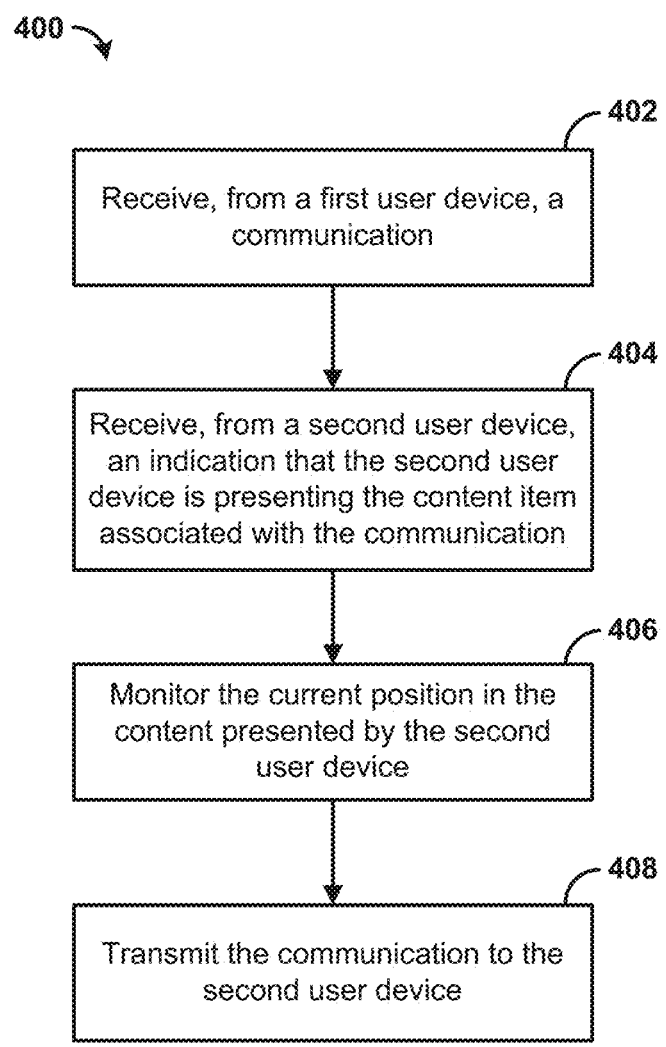

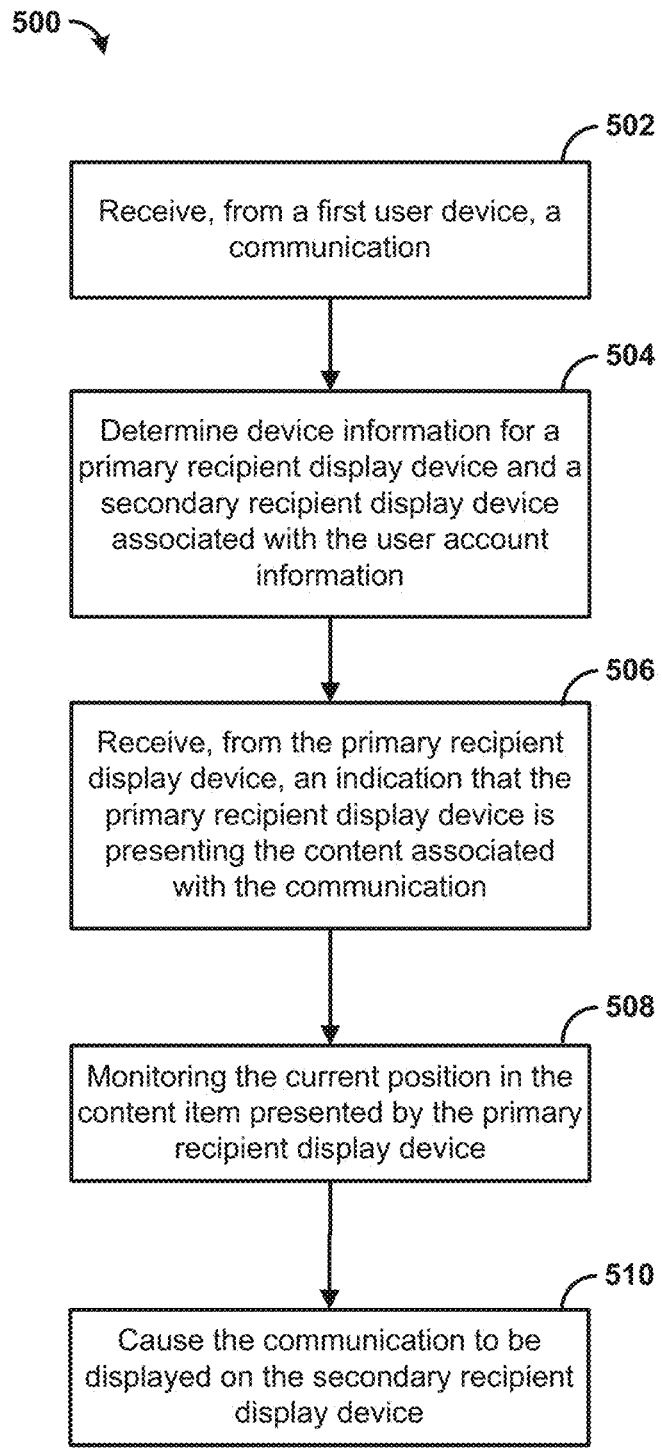

METHODS AND SYSTEMS FOR DELAYING MESSAGE NOTIFICATIONS

BACKGROUND

Users often desire to share their impressions of viewed content with friends/family. Often, the viewers will use their phone (or other communication device) to send messages relating to their impressions of the viewed content to friends/family. There may be some friends/family, however, that may view the same content at a later time, and are sensitive to receiving information related to the content prior to viewing themselves (e.g., they want to avoid so-called "spoilers"). Accordingly, viewers might avoid communicating and sharing their impressions. Alternatively viewers may use communication methods that allow screening for spoilers, such as an email marked with a warning. However, this can disrupt a viewer's normal flow of communication. These and other shortcomings of the prior art are addressed by the present disclosure.

SUMMARY

It is to be understood that both the following general description and the following detailed description are exemplary and explanatory only and are not restrictive. Provided are methods and systems for providing communications.

In an aspect, communications can comprise one or more messages related to a content item (e.g., television show, movie, sporting event, etc. . . . ) being displayed or presented by a content display device. In some aspects, a user may wish to comment on an event (e.g., scene, plot twist, goal, etc. . . . ) that takes place within the content item, and to provide the comment to another viewer without "spoiling" the event; for example, if the other viewer has not yet watched the content item, or, is watching the content item, but has not yet viewed the event. Accordingly, a user who originates the comment can generate a message that that can be sent as a communication. The communication, and in particular how it is created, packaged, transmitted and ultimately presented, allows the sending user to share one or more comments with a recipient without spoiling the event. In one aspect, the recipient can be notified that the communication has been received, but without displaying the contents of the communication. In one implementation, the recipient's viewing behavior can be monitored and once it is determined that the recipient has viewed the event and/or the content item associated with the communication, the contents of the communication can be displayed or otherwise presented to the recipient.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a flowchart illustrating an example method;

FIG. 5 is a flowchart illustrating an example method;

DETAILED DESCRIPTION

Figure 1:
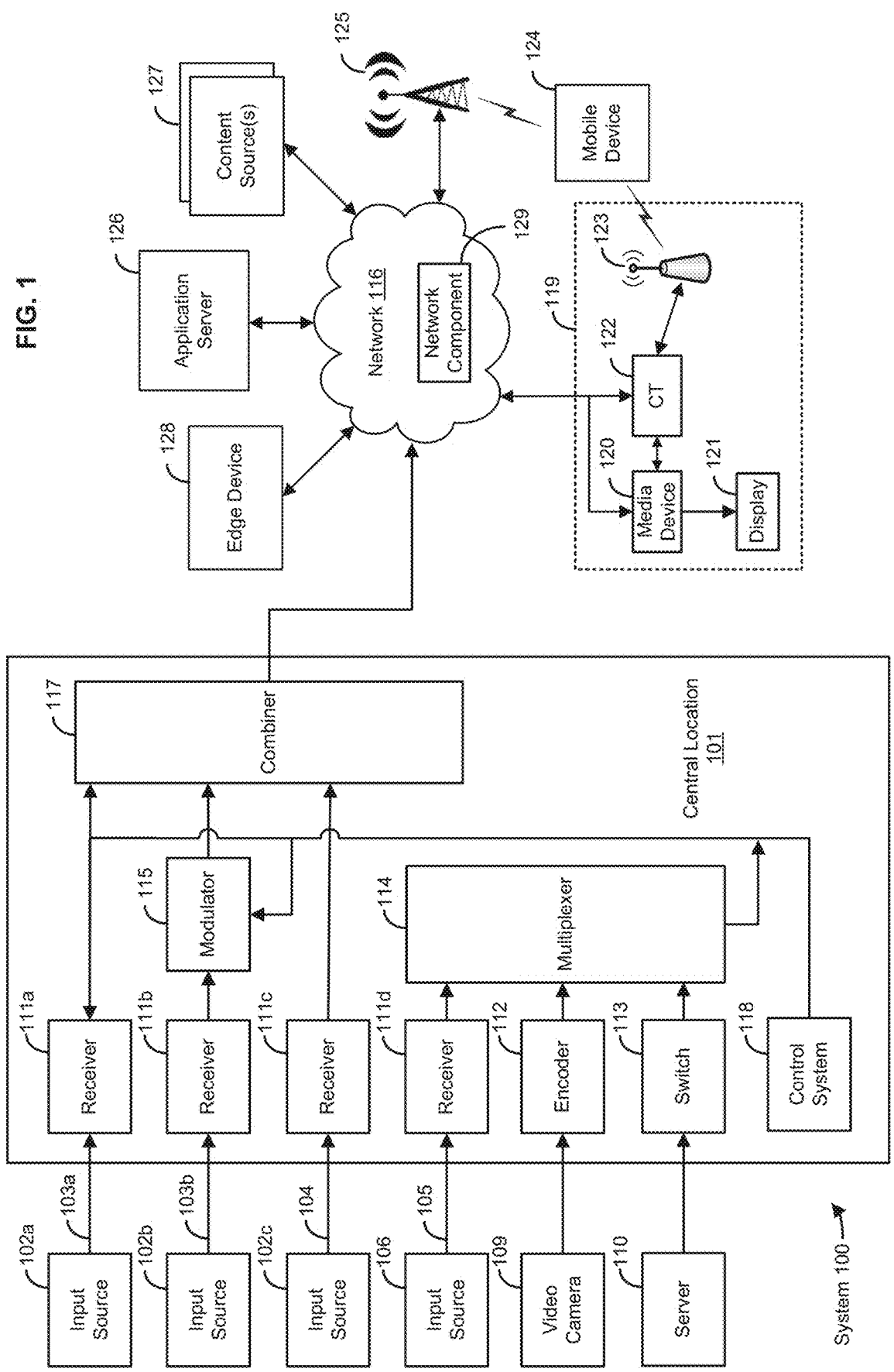
FIG. 1 is block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a" "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format. Adobe® Sound Document (.ASND) format or some other format configured to store electronic audio whether such format is presently known or developed in the future. In some cases, content may include data files adhering to the following formats: Portable Document Format (.PDF). Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to systems and methods for sending and receiving a message, referred to herein as a communication, that can react to content. A user device associated with a sending user (e.g., a sending user device) can be configured to transmit the communication. The communication can comprise, for example, a message portion (e.g., a text message, a photograph, a video, etc.), a content identifier identifying the content the sending user was viewing at a particular time (e.g., a time at which the message was sent, a time at which the sending user began typing the message, etc.), a timestamp indicating a relative position within the content at the particular time, and an address indicating an intended recipient.

In some aspects, the communication can be transmitted from the sending user device via known messaging protocols. For example, the communication can be transmitted as a Short Message Service (SMS) message, a Multimedia Messaging Service (MMS) message, an email, a HyperText Transmission Protocol (HTTP) communication, or any other electronic messaging protocol.

In some aspects, the communication can be transmitted from the sending user device to an intermediate device, such as an IP media subsystem (IMS), a short message service center (SMSC), or the like. The intermediate device can receive the communication from the sending user device. In some aspects, the intermediate device can store the communication and can transmit the communication to a user device associated with a recipient user (e.g., a recipient user device) based on fulfillment of one or more criteria (e.g., the communication can be transmitted to the recipient user device when any device associated with the recipient user (e.g., a phone, tablet computer, laptop computer, television, set top box, etc.) displays content corresponding to the content identifier in the communication, when the device associated with the recipient user reaches a timestamp corresponding to the time stamp of the communication, and/or the like). In other aspects, the intermediate device can transmit the communication to the recipient user device in response to receiving the communication, and the recipient user device can store the communication until a device associated with the recipient user displays content corresponding to the content identifier in the communication and reaches a timestamp corresponding to the time stamp of the communication, and/or the like.

In some aspects, a notification regarding the communication can be transmitted to the recipient user device of the intended the recipient, indicating that the recipient has received a communication. In some aspects, the notification can be transmitted via the intermediate device. In other aspects, the notification can be transmitted via a different path (e.g., directly from the sending user device to the recipient user device, via one or more different intermediate devices, and the like).

The notification can identify the sending user and/or the content item associated with the communication. In some aspects, the notification can be transmitted substantially contemporaneously with transmission of the communication. In other aspects, the notification can be transmitted when the sending user device completes displaying the content.

The recipient user device can display the communication in response to displaying at least a portion of the content item. For example, the recipient user device can display the communication in response to a device associated with the recipient user displaying a portion of the content item corresponding to the time stamp. In some aspects, the communication can be displayed by the recipient user device in response to the recipient user device or any other device associated with the recipient user displaying the content item, in response to the recipient user device or any other device associated with the recipient user displaying a portion of the content item associated with the time stamp, in response to the recipient user device or any other device associated with the recipient user completing display of the content item, and/or the like. In some aspects, displaying the communication can comprise displaying the communication using the same device that displays the content item (e.g., as an overlay on the content). In other aspects, displaying the communication can comprise displaying the communication on a second screen device (e.g., a mobile phone, tablet computer, laptop computer, and/or the like).

FIG. 1 illustrates various aspects of an example system in which the present methods and systems can operate. Those skilled in the art will appreciate that the present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112 are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification (DOCSIS).

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cellular tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park, etc.).

In an aspect, the system 100 can comprise an application server 126. The application server 126 can be a computing device, such as a server. The application server 126 can provide services related to applications. For example, the application server 126 can comprise an application store. The application store can be configured to allow users to purchase, download, install, upgrade, and/or otherwise manage applications. For example, the application server 126 can be configured to allow users to download applications to a device, such as the mobile device 124, communications terminal 122, the media device 120, the display device 121, and/or the like. The application server 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. In some aspects, the network component 129 can comprise an intermediate device. The intermediate device can comprise, for example, a computing device. As particular examples, the intermediate device can comprise one or more of a short message service center (SMSC), an IP Multimedia Subsystem (IMS), and the like. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like In some aspects, one or more of the display 121 or the mobile device 124 can be used to create a communication. In some aspects, the display 121 and/or the mobile device 124 can be used to enter a message for a communication. In some aspects, the message can be entered using a default messaging application present on the device (e.g., an SMS messaging application on the mobile device 124) or a custom messaging application specifically designed for transmitting the communication. The mobile device 124 can further be used to identify a recipient of the communication. For example, the recipient can be identified using an IP address, a MAC address, a phone number, a social networking alias, and/or the like. Sending the message as a part of a communication can comprise using an alternate method of causing the communication to be transmitted. For example, if a normal press of a send button causes a message to be sent as an SMS message, a long press of the send button can cause a message to be sent as a communication, the delivery of which is managed as described herein. In some aspects, causing the message to be sent as a communication can comprise causing the recipient to receive a notification of the communication.

In some aspects, when a message is sent as a communication, the device sending the communication (e.g., the mobile device 124) can transmit the communication to the media device 120 (e.g., a terminal, set-top box, a media device comprising a display device, smart phone, etc.). For example, the alternate method of causing the communication to be transmitted can cause the device sending the communication to transmit the communication to the media device 120. Alternatively, the custom messaging application specifically designed for communication messaging can cause the device sending the communication to transmit the communication to the media device 120. The media device 120 can supplement the communication with additional information, such as a content identifier identifying a content item being presented by the media device and a timestamp indicating a relative time within the content item. The media device 120 can transmit the communication to the network component 129. In other aspects, the communication can be transmitted directly to the network component 129 and one or more server computers in communication with the network component 129 can supplement the communication with a content identifier identifying a content item being presented to the sending user and a timestamp indicating a relative time within the content item.

In some aspects, the network component 129 can be connected (e.g., via the Internet) to a recipient of the communication. The network component 129 can transmit at least a portion of the communication to the recipient device. In some aspects, the recipient device can comprise another media device 120. The portion of the communication can comprise, for example, the content identifier, the sending user, and/or the timestamp. The recipient media device 120 can cause display of the at least the portion of the communication. For example, the at least the portion of the communication can be displayed at one or more of a recipient display 121 or a recipient mobile device 124. In some aspects, the recipient media device 120 can further cause display of a link to the content associated with the content identifier.

In response to the recipient media device 120 causing display of the content associated with the communication notification (e.g., by clicking the link to the content item or by otherwise displaying the content item) the recipient media device 120 can provide an indication to the network component 129. In some aspects, the indication can be transmitted in response to a query from the network component 129. The indication can comprise, for example, one or more of a content identifier identifying the content being displayed and a timestamp indicating a position within the content being displayed. In some aspects, when the content being displayed matches the content identifier of the communication notification and the timestamp transmitted by the recipient media device 120 meets or exceeds the timestamp of the communication, the network component 129 can transmit at least the communication of the communication to the recipient media device 120. The recipient media device 120 can cause display of the message component at, for example, one or more of a display (e.g., display 121) and a portable device (e.g., portable device 124).

In other aspects, the network component 129 can be connected (e.g., via the Internet) to a recipient of the communication. The network component 129 can transmit the communication to the recipient device. In some aspects, the recipient device can comprise another media device 120. The recipient media device 120 can cause display of at least a portion of the received communication comprising, for example, the content identifier, the sending user, and/or the timestamp. For example, the at least the portion of the communication can be displayed at one or more of a recipient display 121 or a recipient mobile device 124. In some aspects, the recipient media device 120 can further cause display of a link to the content associated with the content identifier.

In response to the recipient media device 120 causing display of the content associated with the communication notification (e.g., by clicking the link to the content item or by otherwise displaying the content item) the recipient media device 120 can periodically determine a timestamp indicating a position within the content being displayed. In some aspects, when the content being displayed matches the content identifier of the communication notification and the determined timestamp meets or exceeds the timestamp of the communication, the recipient media device 120 can cause display of the communication component of the communication at, for example, one or more of a display (e.g., display 121) and a portable device (e.g., portable device 124).

Figure 2:
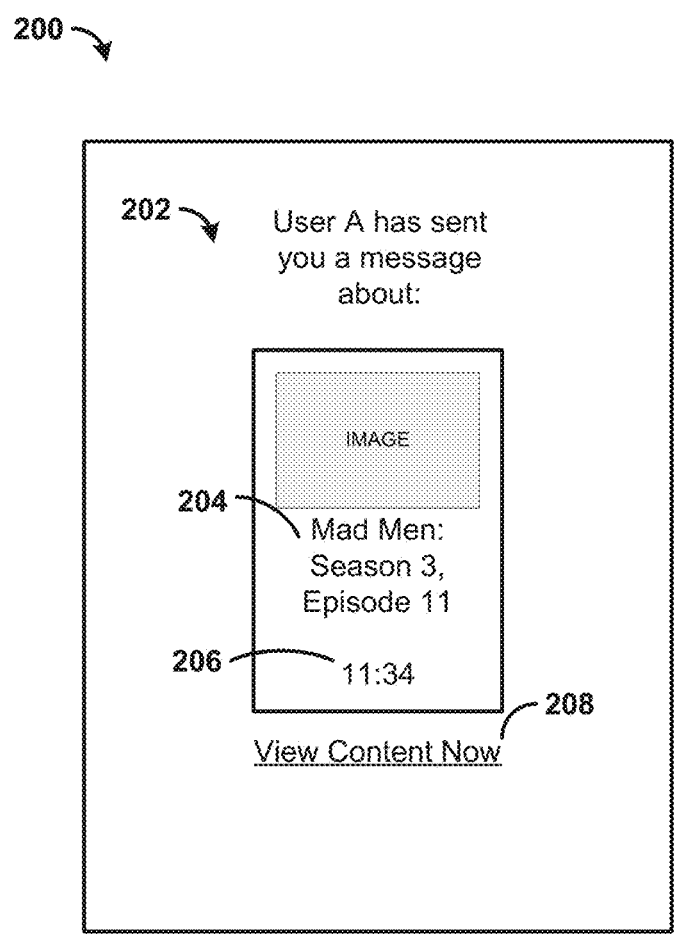
FIG. 2 is an illustration of a sample interface.

FIG. 2 shows an example interface 200 for a received notification 202 associated with a communication, indicating that a user has received a communication from "User A". In some aspects, the received notification 202 can comprise, for example, a content identifier 204. The content identifier 204 can comprise one or more of a text description of the content and an image indicating a content item associated with the communication. For example, FIG. 2 shows a content identifier 204 comprising an image (e.g., a show logo or title screen) and a text description indicating that the content item is "Mad Men Season 3 Episode 11." The received communication notification 202 can further comprise a timestamp 206 indicating a relative position within the content item. As an example, FIG. 2 shows a timestamp 206 of 11:34, indicating that the communication is regarding an event that takes place 11 minutes and 34 seconds into the content item. The received communication notification 202 can further comprise a link 208 to the content item identified by the content identifier 204. In some aspects, the link, when activated by a user, can cause display of the content item on the device used to activate the link (e.g., in response to a user activating a link using a smartphone, playback of the content item is initiated on the smartphone). In other aspects, activation of the link can cause a user device (e.g., media device 120) to display or otherwise present the content item. For example, in response to the user activating a link using a smartphone associated with the user, the content item can be displayed on a display connected to a set top box associated with the user. In some aspects, causing the content item to be displayed can comprise causing the content item to be displayed from a beginning of the content item. In other aspects, causing the content item to be displayed can comprise causing the content item to be displayed from the timestamp.

Figure 3A:
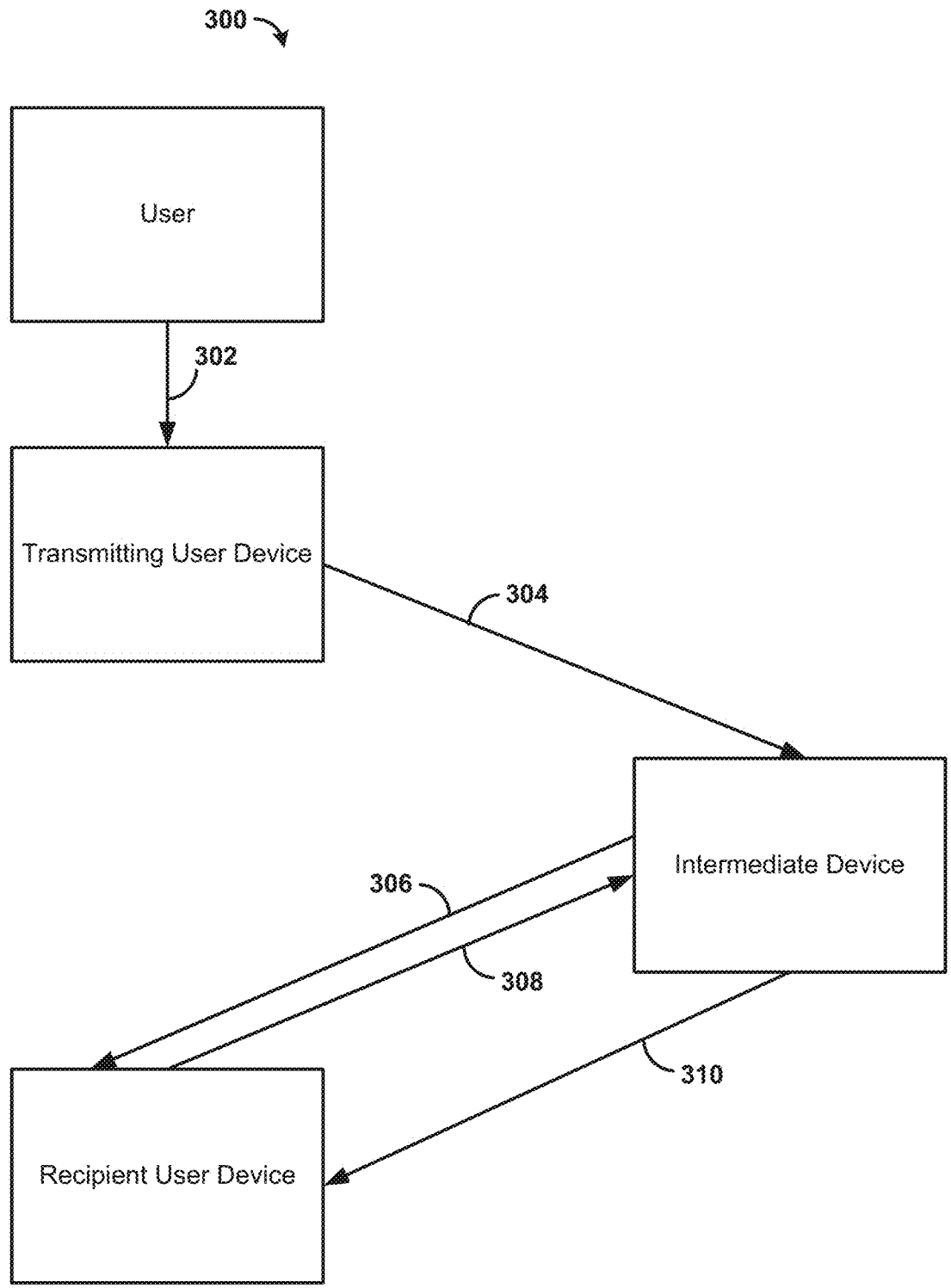
FIG. 3A shows an example data flow in a system.

FIG. 3A shows an example data flow 300 in a system. At 302, a user can compose a communication from a transmitting user device. In some aspects, the communication can be composed at a primary display device (e.g., the media device 120). In other aspects the communication can be composed using a secondary display device (e.g., the mobile device 124). In an aspect, composing the communication can comprise entering a message. The message can comprise a text message, an image, an audio message (e.g., from a voice remote control device), a video message, and/or the like. The transmitting user device can determine a content identifier associated with current content being displayed and a current timecode (e.g., a time offset from a beginning of the content item). The user can further specify a recipient of the communication using an address (e.g., an IP address, a MAC address, a telephone number, a social networking account name, an email address, a handle, and/or the like) of an intended recipient device. At 304, the transmitting user device can send the communication to an intermediate device (e.g., the network component 129), such as a Short Message Service Center (SMSC) and/or an Internet Multimedia Subsystem (IMS) capable of receiving messages such as SMS and/or MMS messages from a device. The intermediate device can store the communication.

In some aspects, the intermediate device can transmit a notification to the recipient device at 306. The notification can comprise, for example, the content identifier and/or a link to the content.

The intermediate device can monitor a recipient device (e.g., the device specified in the communication) to determine if the communication should be transmitted to the recipient device. The communication is transmitted to the recipient device after the recipient device has displayed or otherwise presented the timecode and the content item identified in the communication. At 304, the intermediate device can request data indicating the content item and timecode being presented by the recipient device. In some aspects, the intermediate device can request the data periodically (e.g., the intermediate device can poll the recipient device).

At 308, the recipient device can provide data to the intermediate device in response to the request. The provided data can comprise at least a content identifier associated with a content item currently being displayed or otherwise presented at the recipient device. The provided data can further comprise a timecode indicating an offset relative to a beginning of the content item.

The intermediate device can compare the received data to the content identifier and the timecode stored in the communication. If the content identifier and/or the timecode indicates that the recipient device has not yet displayed the portion of the content associated with the communication, then no action is taken by the intermediate device and the intermediate device can continue to poll the recipient device. If the content identifier and/or the timecode indicates that the recipient device has displayed the portion of the content associated with the communication (e.g., the content identifier from the recipient device matches the content identifier in the communication and the timecode from the recipient device substantially matches the timecode in the communication), the intermediate device can cause display of the communication to the recipient device at 310.

Figure 3B:
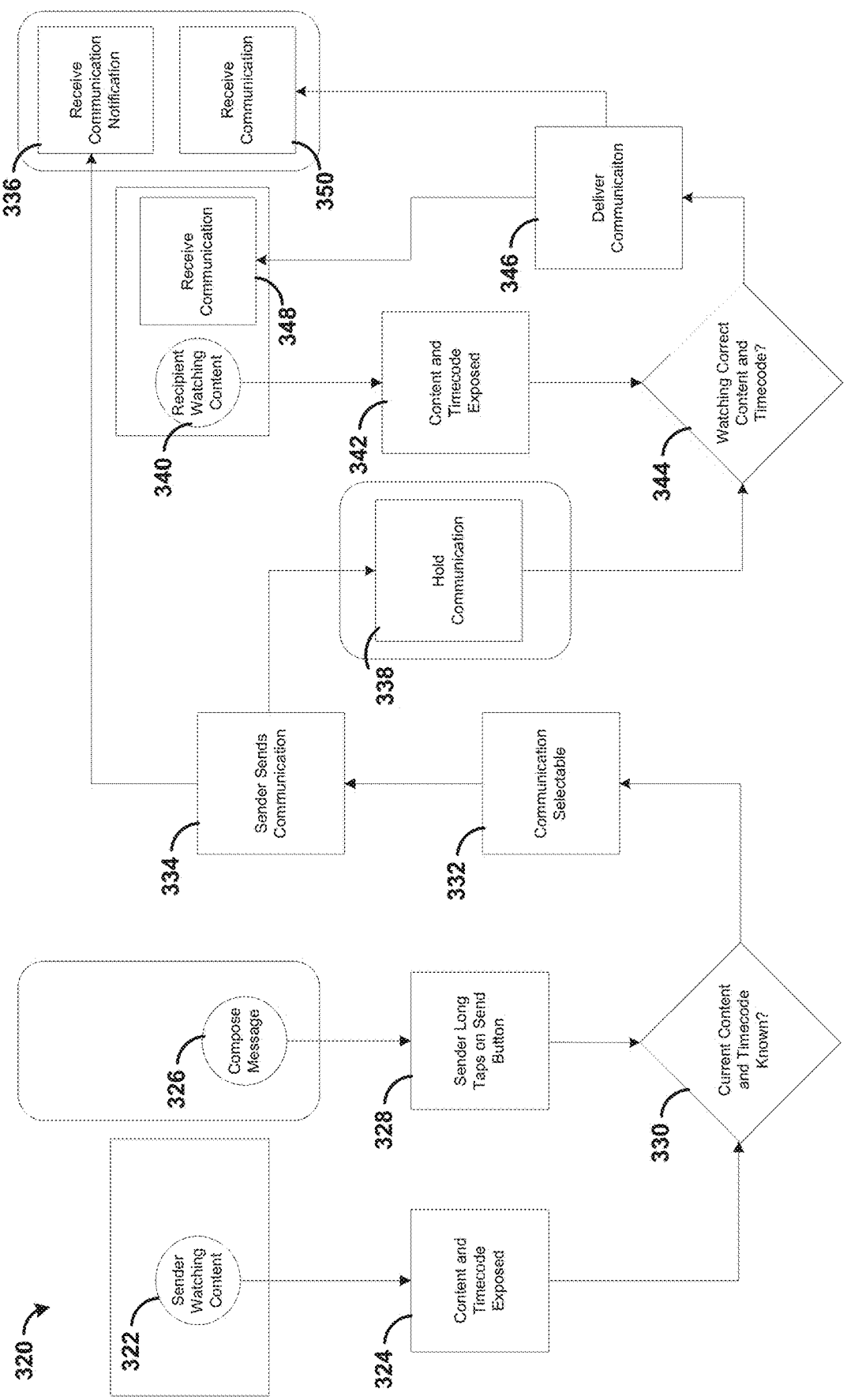
FIG. 3B shows an example data flow in a system.

FIG. 3B shows an example data flow 320 in a system. At 322, a user (e.g., a sending user) can watch content. In some aspects, the content can be present for watching by the user at a primary display device (e.g., the media device 120). The content can be associated with a content identifier. For example, the content identifier can comprise one or more of a title, a season and/or episode number, and/or any other unique identifier. The content can also comprise a timecode indicating an offset from a beginning of the content. At 324, the content identifier and the timecode can be exposed. For example, an application program interface (API) used to present the content can also provide access to the content identifier and/or the timecode to one or more devices associated with the user (e.g., the mobile device 124).

At 326, a user can compose a communication from a user device. In some aspects, the communication can be composed using a secondary display device (e.g., the mobile device 124). In an aspect, composing the communication can comprise entering a message. The message can comprise a text message, an image, an audio message (e.g., from a voice remote control device), a video message, and/or the like. The user can further specify a recipient of the communication using an address (e.g., an IP address, a MAC address, a telephone number, a social networking account name, an email address, a handle, and/or the like) of an intended recipient device. At 328, the user can indicate that the message is to be sent as a communication, the delivery of which is managed as described herein. For example, when a regular tap of a send icon would result in sending the message as a traditional SMS or MMS message, a long press can be used to indicate that the message is to be sent as a communication, the delivery of which is managed as described herein. In other aspects, distinct messaging applications can be used to send SMS and/or MMS messages and communications.

At 330, the transmitting user device can determine whether a content identifier associated with current content being displayed and a current timecode (e.g., a time offset from a beginning of the content item) are known. For example, the content identifier and the timecode can be accessed via the API from 324. If the content identifier and the timecode are known, the communication can be selected at step 332. The communication can be transmitted at step 334. In some aspects, transmitting the communication can comprise sending the communication to an intermediate device (e.g., the network component 129), such as a Short Message Service Center (SMSC) and/or an Internet Multimedia Subsystem (IMS) capable of receiving messages such as SMS and/or MMS messages. In some aspects, transmitting the communication can further comprise transmitting a communication notification to the recipient of the communication. The communication notification can identify the sending user and/or the content item associated with the communication. In some aspects, the communication notification can be transmitted via the intermediate device. In other aspects, the communication notification can be transmitted via a different path (e.g., directly from the sending user device to the recipient user device, via one or more different intermediate devices, and the like).

At 336, the recipient device (e.g., the secondary display device) can receive the communication notification. In some aspects, receiving the communication notification can comprise displaying the communication notification. For example, at least the sender and the content identifier can be displayed at the recipient device. In some aspects, the communication notification can be a message to the receiving user that indicates a communication has been sent to the receiving user, but not actually displaying the message of the communication.

At 338, the intermediate device can receive and hold the communication. The intermediate device can hold the communication indefinitely until one or more criteria are met. For example, the intermediate device can hold the communication until the recipient views content associated with the content identifier and timecode of the communication. At 340 the recipient user can be viewing content. The content can be associated with a content identifier. For example, the content identifier can comprise one or more of a title, a season and/or episode number, and/or any other unique identifier. The content can also comprise a timecode indicating an offset from a beginning of the content. At 342, the content identifier and the timecode associated with the content being watched by the recipient can be exposed. For example, an API used to present the content to the recipient can also provide access to the content identifier and/or the timecode to one or more devices associated with the user (e.g., the mobile device 124).

At 344, it can be determined whether the content identifier and timecode associated with the content being watched by the recipient corresponds to the content identifier and timecode of the communication. In some aspects, the determination can be made periodically. In some aspects, the determination can be made at the intermediate device. For example, the intermediate device can monitor the content being watched by the recipient. In other aspects, the determination can be made at a recipient device (e.g., the media device 120).

When the content identifier associated with the content being watched by the recipient matches the content identifier of the communication and the timecode associated the content being watched by the recipient meets or exceeds the timecode of the communication, the communication can be delivered to the recipient at 346. In some aspects, delivering the communication to the recipient can comprise delivering the communication to the primary display device (e.g., the media device 120) and/or the secondary display device (e.g., the mobile device 124). At 348, the primary display device can receive the communication. In some aspects, receiving the communication at the primary display device can comprise displaying at least a portion of the communication. The portion of the communication to be displayed can comprise at least the message. At 350, the secondary display device can receive the communication. In some aspects, receiving the communication at the secondary display device can comprise displaying at least a portion of the communication. The portion of the communication to be displayed can comprise at least the message.

FIG. 4 shows an example method 400. At step 402, a server can receive, from a first user device, a communication. In some aspects, the server can comprise one or more intermediate devices (e.g., an SMSC and/or an IMS). The first user device can comprise a computing device associated with (e.g., controlled by, owned/rented by, etc.) a first user. In some aspects, the communication can be received directly from the first user device. In other aspects, the communication can be received from the first user device via one or more intermediate devices, such as an SMSC, an IMS, and/or the like. In some aspects, the communication can be addressed to a second user device, for example a computing device associated with (e.g., controlled by, owned/rented by, etc.) a second user. For example, the communication can comprise an address (e.g., an IP address, a MAC address, a telephone number, a social networking account name, and/or the like) of an intended recipient device (e.g., the second user device). In some aspects, the communication can comprise a message (e.g., a text message, an image, an audio message (e.g., from a voice remote control device), a video message, and/or the like), a content identifier (e.g., an identifier associated with a content item from a content provider), and/or a timestamp indicating a position within the content item associated with the content identifier. In some aspects, the content identifier can further comprise a link to the content item.

In some aspects, the communication can be received by the server in response to the first user device completing display of the content item. For example, when the content comprises linear content (e.g., a live television program) the communication can be sent from the first user device to the server after the linear program has completed airing. In other aspects, the communication can be transmitted to the server substantially immediately upon creation of the communication by the first user device.

Optionally, at least a portion of the communication can be transmitted to the second user device in response to the server receiving the communication. As an example, the portion of the communication can comprise the content identifier and/or the timestamp. In some aspects, the communication (or a portion thereof) can comprise the entire communication. In some aspects, transmitting the at least the portion of the communication to the second user device can cause the second user device to display the content identifier at the second user device. In some aspects, transmitting the at least the portion of the communication to the second user device can cause the second user device to display the content identifier and the timestamp at the second user device.

At step 404, the server can access or receive an indication that the second user device is presenting the content item associated with the content identifier. As a particular example, the intermediate device can receive the indication from the second user device. In some aspects, the indication can be received from the second user device. In other aspects, the indication can be received from the intermediate device. In some aspects, the indication can comprise additional information, such as a current position in the content item.

At step 406, the server can monitor the current position in the content item being presented by the second user device. The monitoring can be periodic or substantially continuous. In some aspects, to perform the monitoring function, the server can receive data related to whether or not the second user device has accessed or presented the content item. The data can be received or accessed periodically (e.g., once per minute), and can comprise the indication that the content item is being consumed. In other aspects, the server can receive the indication in response to a request to provide an indication transmitted from the server to the second user device. For example, the server can transmit the request to provide the indication regularly (e.g., poll) to the second user device.

In some aspects, a polling period can be determined based on one or more of: whether the second user is watching content, whether the second user is watching the content item that matches the content indicated by the communication, and whether the position within the content item that the second user is watching is beyond the position of the communication. If the second (e.g., receiving) user is not watching any content, then there would be no polling period (e.g., polling period is set to zero). If the second user is watching content that does not match the content item indicated by the communication the polling period can be set to, for example, approximately 1-10 minutes, and approximately 10 seconds after the second user begins watching a new content item. If the second user is watching content that matches the content item indicated by the communication, the polling period can be set to approximately 3-5 seconds. In some aspects, if the second user is watching content that matches the content item indicated by a communication and the position within the content item that the second user is watching is beyond the position of the communication, the polling period can be set to 0.

In some aspects, the monitoring can comprise the server determining whether the second user device has displayed a portion of the content item associated with the timestamp. In some aspects, the determination can be based on, for example, the current position in the content item. As a particular example, the determination can comprise comparing the position in the communication to the current position.

At step 408, the server can transmit the communication to the second user device in response to determining that the second user device has displayed or otherwise presented the portion of the content item associated with the position of the communication. In some aspects, the communication can be displayed on the second user device in response to the communication being transmitted to the second user device. Displaying the communication can comprise one or more of displaying a text message, displaying an image, displaying an audio message, and displaying a video message. For example, at least the portion of the communication comprising the message can be displayed or otherwise presented in response to determining that the second user device has displayed or presented the portion of the content associated with the communication.

FIG. 5 shows an example method 500. At step 502, a server can receive, from a first user device associated with a first user, a communication. In some aspects, the server can comprise, for example, one or more intermediate devices such as an SMSC and/or an IMS. In some aspects, the communication can comprise user account information associated with a second recipient user. For example, the user account information can comprise an IP address and/or a MAC address associated with the a device used by the second user, a telephone number associated with the second user, a social networking account name associated with the second user, and/or the like The communication can further comprise a message, such as a text message, an image, an audio message, a video message, or the like. The communication can further comprise a content identifier associated with a content item (e.g., an identifier associated with a content item from a content provider) and/or a position of an event within the content item associated with the content identifier. In some aspects, the content identifier can further comprise a link to the content item.

At step 504, the server can determine recipient device information associated with the recipient user account information of the communication. The recipient device information can comprise, for example, a first address (e.g., an IP address, a MAC address, and/or the like) corresponding to a primary recipient display device (e.g., a set top box, a smart television, etc.) and a second address (e.g., an IP address, a MAC address, a telephone number, and/or the like) corresponding to a secondary recipient display device (e.g., a mobile phone, tablet computer, laptop computer, and/or the like).

Optionally, the server can transmit at least a portion of the communication to the primary recipient display device and/or the secondary recipient display device. As examples, the at least the portion of the communication can comprise the content identifier and/or the timestamp. In some aspects, the at least the portion of the communication can comprise the entire communication. In some aspects, transmitting the at least the portion of the communication to the primary recipient display device and/or the secondary recipient display device can cause the at least the portion of the communication to be displayed on one or more of the primary recipient display device and/or the secondary recipient display device. For example, transmitting the at least the portion of the notification to the primary recipient display device can cause the primary recipient display device to display the content identifier and the timestamp; transmitting the at least the portion of the notification to the secondary recipient display device can cause the secondary recipient display device to display the content identifier and the timestamp.

In some aspects, the communication can be transmitted to the server in response to the first user device completing display of the content item. In other aspects, the communication can be transmitted from the first user device to the server substantially immediately upon creation of the communication by the first user device.

At step 506, the server can receive an indication that the primary recipient display device is displaying or otherwise presenting the content item associated with the content identifier in the communication. In an aspect, the server can receive the indication from the primary recipient display device. In some aspects, the indication can be received directly from the primary recipient display device. In other aspects, the indication can be received from an intermediate device. In some aspects, the indication can comprise additional information, such as a current position in the content item.

At step 508, the server can monitor the current position in the content item presented by the primary recipient display device. The monitoring can be periodic or substantially continuous. In some aspects, to perform the monitoring function, the server can receive data related to whether or not the primary recipient display device has accessed or presented the content item. The data can be received or accessed periodically (e.g., once per minute), and can comprise the indication that the content item is being consumed. In other aspects, the server can receive the data in response to a request to provide the data transmitted from the server to the primary recipient display device. For example, the server can transmit the request to provide the indication regularly (e.g., poll) to the primary recipient display device.

In some aspects, a polling period can be determined based on one or more of: whether the second user is watching content, whether the second user is watching the content item that matches the content indicated by the communication, and whether the position within the content item that the second user is watching is beyond the position of the communication. If the second (e.g., receiving) user is not watching any content, then there would be no polling period (e.g., polling period is set to zero). If the second user is watching content that does not match the content item indicated by the communication the polling period can be set to, for example, approximately 1-10 minutes, and approximately 10 seconds after the second user begins watching a new content item. If the second user is watching content that matches the content item indicated by the communication, the polling period can be set to approximately 3-5 seconds. In some aspects, if the second user is watching content that matches the content item indicated by a communication and the position within the content item that the second user is watching is beyond the position of the communication, the polling period can be set to 0.

The monitoring can further determine whether the primary recipient display device has displayed the portion of the content item associated with the event. In some aspects, the determination can be based on, for example, the current position in the content item and the position of the event. As a particular example, the determination can comprise comparing the position of the event to the current position (e.g., the position received from polling the primary recipient display device).

At step 510, the server can cause at least the communication to be displayed or otherwise presented by the at least the secondary recipient display device in response to determining that the primary recipient display device has displayed the portion of the content item associated with the event. In some aspects, causing the communication to be displayed can comprise one or more of causing display of a text message, displaying an image, displaying an audio message, and displaying a video message. In some aspects, causing the communication to be displayed can further comprise causing the communication to be displayed on the primary recipient display device. In other aspects, causing the communication to be displayed can comprise causing the message to be displayed only by the secondary recipient display device.

Figure 6:
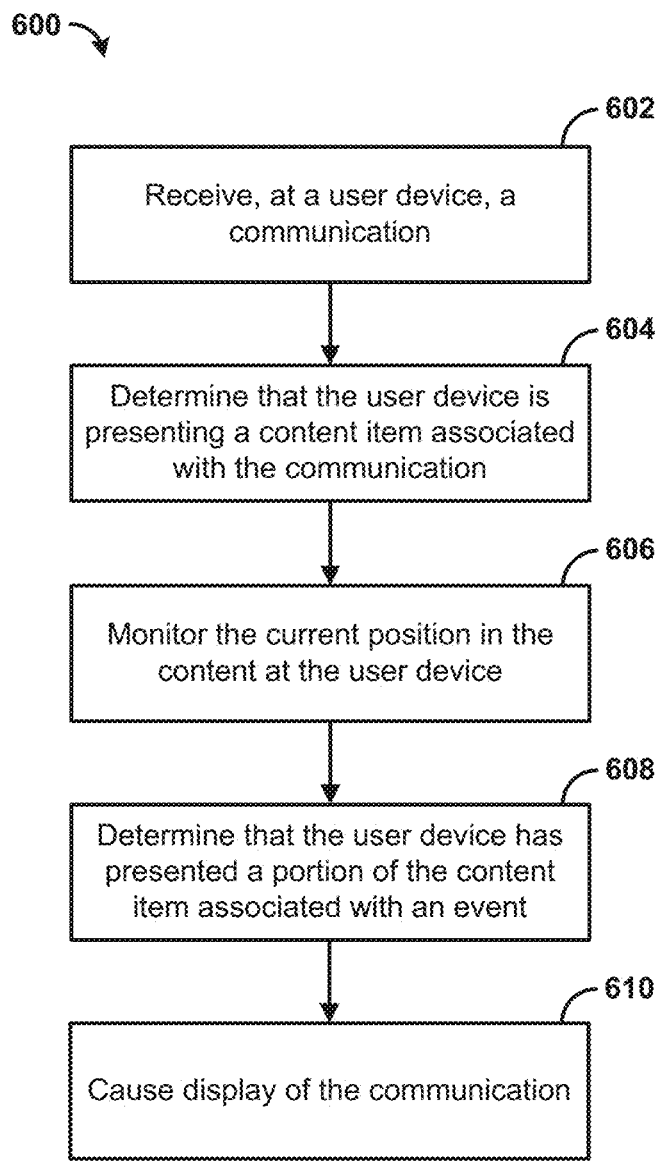
FIG. 6 is a flowchart illustrating an example method.

FIG. 6 shows an example method 600. At step 602, a user device can receive a communication. In some aspects, the communication can be received from an intermediate device such as a message server (e.g., an SMSC and/or and IMS). The communication can comprise a communication and a content identifier associated with a content item. In some aspects, the content identifier can further comprise a link to the content item. In some aspects, the communication can further comprise a position of an event within a content item associated with the content identifier. In some aspects, the user device can display at least a portion of the received communication in response to receiving the communication. For example, the user device can display the content identifier and/or the position of the event in response to receiving the communication.

At step 604, the user device can determine whether the user device is presenting (e.g., playing, displaying, etc.) the content item. In some aspects, determining whether the user device is presenting the content item can be based on the content identifier of the communication. For example, determining whether the user device is presenting the content item can comprise comparing a content identifier of the content item currently being presented by the user device to the content identifier of the communication. In some aspects, the user device can determine whether the user device is displaying the content item periodically.

At step 606, the user device can monitor the current position in the content item presented by the user device. The monitoring can be periodic or substantially continuous. In some aspects, to perform the monitoring function, the user device can determine whether or not the primary recipient display device has accessed or presented the content item. The user device can make the determination periodically. In other aspects, the user device can provide data indicating the current position of the content item to a server. The data can be provided periodically (e.g., once per minute), and can comprise the indication that the content item is being consumed. In other aspects, the user device can provide the data in response to receiving a request to provide the data transmitted from the server. For example, the serve can transmit the request to provide the indication regularly (e.g., poll) to the user device.

In some aspects, a polling period can be determined based on one or more of: whether the user is watching content, whether the user is watching the content item that matches the content indicated by the communication, and whether the position within the content item that the user is watching is beyond the position of the communication. If the user is not watching any content, then there would be no polling period (e.g., polling period is set to zero). If the user is watching content that does not match the content item indicated by the communication the polling period can be set to, for example, approximately 1-10 minutes, and approximately 10 seconds after the second user begins watching a new content item. If the second user is watching content that matches the content item indicated by the communication, the polling period can be set to approximately 3-5 seconds. In some aspects, if the second user is watching content that matches the content item indicated by a communication and the position within the content item that the second user is watching is beyond the position of the communication, the polling period can be set to 0.

At step 608, the user device can determine whether the user device has presented a portion of the content item associated with the event. In some aspects, determining whether the user device has presented the portion of the content item associated with the event can be performed in response to determining that the user device is displaying the content item in step 604 and/or the current position of the content item being displayed determined in step 606. Determining whether the user device has presented a portion of the content item associated with the event can be performed based on a current position within the content item. For example, the current position within the content item can be compared with the position of the event. In some aspects, the determination can be repeated periodically. For example, the determination can be repeated approximately once every 3-5 seconds.

At step 610, the user device can cause display of the at least a portion of the communication in response to determining that the user device has presented the portion of the content item associated with the event. In some aspects, causing display of the at least the portion of the communication can comprise causing display of at least the message. In some aspects, causing display of the at least the portion of the communication can comprise displaying the at least the portion of the communication on the user device. In other aspects, causing display of the at least the portion of the communication can comprise transmitting an instruction to display the at least the portion of the communication to a device associated with the user device. For example, the device associated with the user device can comprise a smartphone, a tablet computer, a laptop computer, and/or the like. In some aspects, displaying the message can comprise one or more of displaying a text message, displaying an image, displaying an audio message, and displaying a video message.

Figure 7:
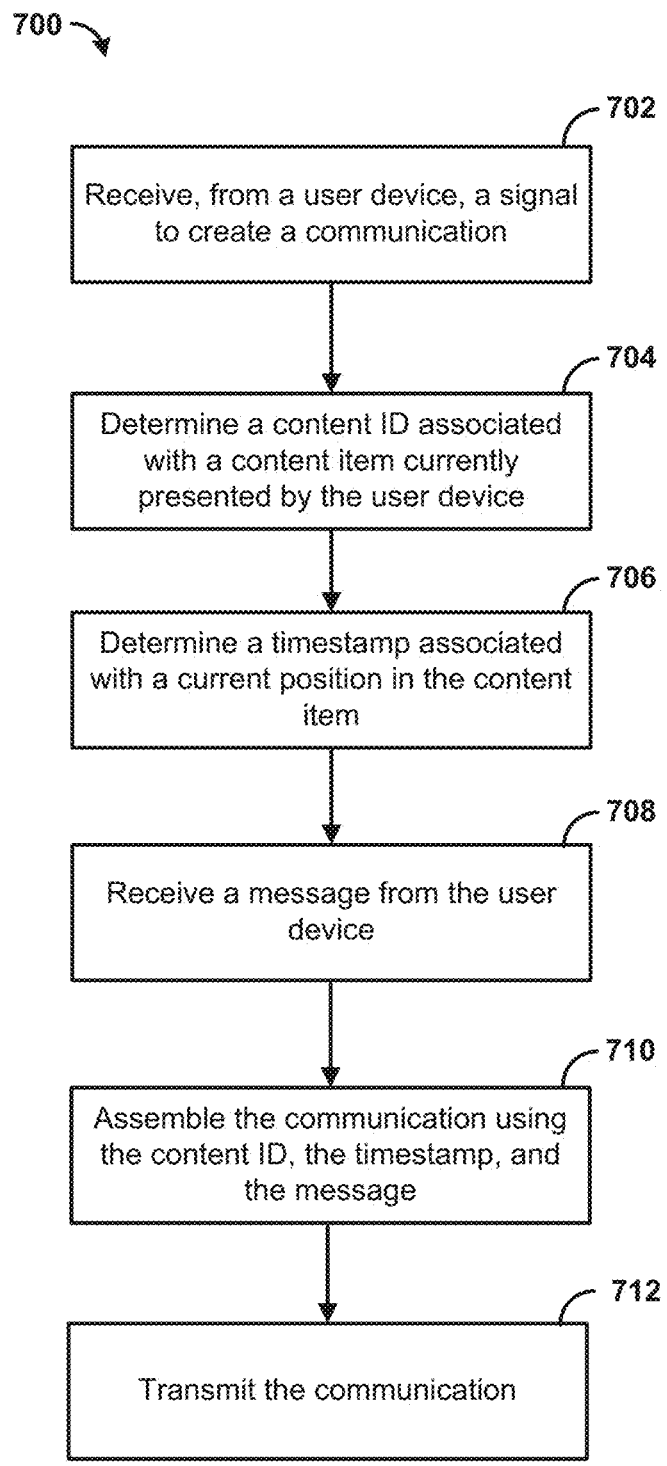
FIG. 7 is a flowchart illustrating an example method.

FIG. 7 shows an example method 700. At step 702, a computing device can receive a signal to create a communication. In some aspects, the computing device can comprise a message server (e.g., an SMSC and/or and IMS). In some aspects, the signal can be generated by a user using an alternate method of causing a message to be transmitted. For example, if a normal press of a send button in a messaging application causes a message to be sent as an SMS message, a long press of the send button can cause a message to be sent as a communication, the delivery of which is managed as described herein. In some aspects, the signal can be generated by a custom messaging application running on a user device.

At step 704, the computing device can determine a content ID associated with a content item currently displayed to the user. In some aspects, determining the content ID can comprise receiving an indication of the content ID from the user device. In other aspects, determining the content ID can comprise querying a content server to determine content currently being provided to the user.

At step 706, the computing device can determine a timestamp associated with a current position in the content item. In some aspects, determining the timestamp can comprise receiving a timestamp from the user device. In other aspects, determining the timestamp can comprise querying the content server to determine a position in the content item. The timestamp can comprise a time indicative of, for example, a position within the content item when the signal to create the communication was transmitted to the computing device, a position within the content item when the user began creating the communication, a position within the content item when the computing device transmitted the query to the content server, and/or the like.

At step 708, the computing device can receive a message from the user device. In some aspects, the message can comprise, for example, a text message, a picture, a video message, and/or an audio message. In some aspects the message can be received as a part of the signal to create the communication. In other aspects, the communication can be received after the signal to create the communication.

At step 710, the computing device can assemble the communication. For example, the system can concatenate or otherwise bundle at least the content ID, the timestamp, and the message. The computing device can further determine an intended recipient of the communication. For example, the computing device can receive an address (e.g., an IP address, a MAC address, telephone number, social networking account name, and/or the like) of a recipient user device.

At step 712, the computing device can transmit at least a portion of the communication to the recipient user device. In an aspect, transmitting the at least a portion of the communication can comprise transmitting the message. In other aspects, transmitting the at least a portion of the communication can comprise transmitting the entire communication.

Figure 8:
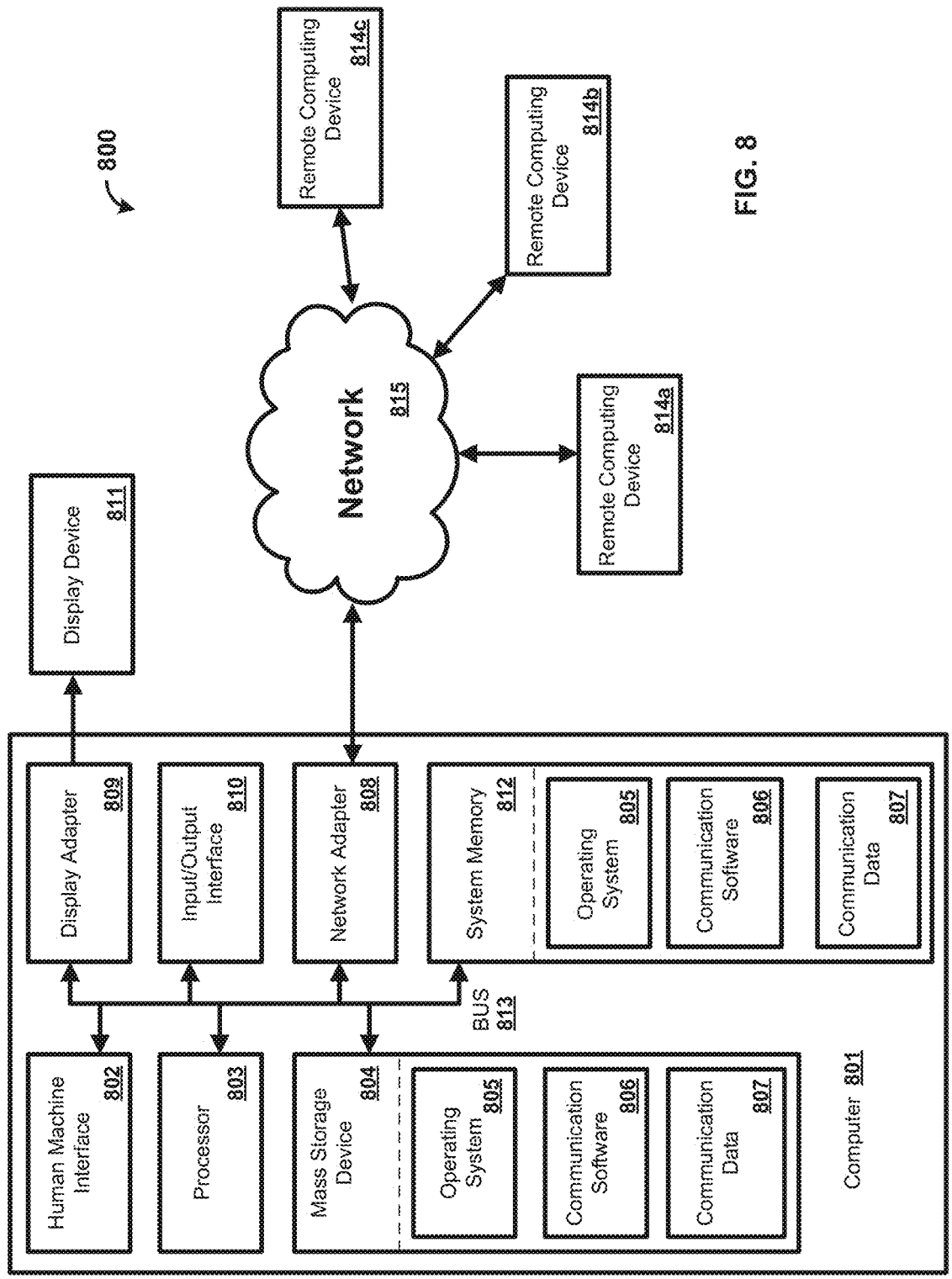
FIG. 8 is a block diagram illustrating an example computing device.

In an aspect, the methods and systems can be implemented on a computer 801 as illustrated in FIG. 8 and described below. The methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, communication software 806, communication data 807, a network adapter 808, the system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the communication data 807 and/or program modules such as the operating system 805 and the communication software 806 that are immediately accessible to and/or are presently operated on by the one or more processors 803.

In another aspect, the computer 801 can also comprise other removable/non-removable, volatile/non-volatile computer storage media. By way of example, FIG. 8 illustrates the mass storage device 804 which can provide non-volatile storage of computer code, computer readable instructions, data structures, program modules, and other data for the computer 801. For example and not meant to be limiting, the mass storage device 804 can be a hard disk a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the communication software 806. Each of the operating system 805 and the communication software 806 (or some combination thereof) can comprise elements of the programming and the communication software 806. The communication data 807 can also be stored on the mass storage device 804. The communication data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, the display device 811 can also be connected to the system bus 813 via an interface, such as the display adapter 809. It is contemplated that the computer 801 can have more than one display adapter 809 and the computer 801 can have more than one display device 811. For example, the display device 811 can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814*a,b,c*. By way of example, a remote computing device can be a personal computer, portable computer, smartphone, a server, a router, a network computer, a peer device or other common network node, and so on. Logical connections between the computer 801 and a remote computing device 814*a,b,c* can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the one or more processors 803 of the computer. An implementation of the communication software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM. ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, from a first device associated with a first user, a communication comprising a content identifier, a position of an event within a content item associated with the content identifier, and a message generated by the first user, wherein the message is associated with the event;
   receiving, from a second device associated with a second user, an indication that the second device is causing output of the content item associated with the content identifier and a current position of the content item being output, wherein the second user is different from the first user;

determining, based on the current position of the content item being output and based on the position of the event, that the second device has output a portion of the content item associated with the event; and transmitting, to the second device based on determining that the second device has output the portion of the content item associated with the event, the message.

2. The method of claim 1, further comprising transmitting, to the second device, the content identifier, wherein the second device causes, based on the content identifier, output of an indication of the content item.

3. The method of claim 1, further comprising transmitting, to the second device, a link to the content item.

4. The method of claim 1, further comprising receiving an indication that the second device is causing output of the content item associated with the content identifier.

5. The method of claim 1, wherein determining, based on the current position of the content item being output and based on the position of the event, that the second device has output the portion of the content item associated with the event comprises polling, based on receiving the communication, the second device.

6. The method of claim 1, further comprising receiving, from the first device, data indicating a user account associated with the second user, wherein the user account indicates one or more devices associated with the second user.

7. The method of claim 6, further comprising determining, based on a device identifier, the second device from the one or more devices associated with the second user.

8. A method comprising:

receiving, by a first device associated with a first user, from a computing device, a communication comprising a content identifier, a position of an event within a content item associated with the content identifier, and a message generated by a second user of a second device, wherein the message is associated with the event within the content item, and wherein the first user is different from the second user;

determining, based on the content identifier, that the first device is causing output of the content item;

determining, based on a current position of the content item being output, that the first device has output a portion of the content item associated with the event; and causing, based on determining that the first device has output the portion of the content item associated with the event, output of the message.

9. The method of claim 8, further comprising causing, by the first device, based on receiving the communication, output of a notification comprising at least one of: an indication of the content item, the position of the event, or a link displaying the content item.

10. The method of claim 9, wherein the first device causes, based on an indication of an activation of the link, output of the content item.

11. The method of claim 8, wherein causing output of the message comprises displaying the message on the first device.

12. The method of claim 8, wherein causing output of the message comprises transmitting the message to a third device associated with the first device, and wherein the third device comprises at least one of a second computing device or a mobile device.

13. The method of claim 8, wherein determining that the first device is causing output of the content item comprises comparing an identifier of the content being output by the first device to the content identifier.

14. An apparatus, comprising:

one or more processors; and memory storing processor executable instructions that, when executed by the one or more processors, cause the apparatus to:

receive, from a first device associated with a first user, a communication comprising a content identifier, a position of an event within a content item associated with the content identifier, and a message generated by the first user, wherein the message is associated with the event;

receive, from a second device associated with a second user: an indication that the second device is causing output of the content item associated with the content identifier and a current position of the content item being output, wherein the second user is different from the first user;

determine, based on the current position of the content item being output and based on the position of the event, that the second device has output a portion of the content item associated with the event; and transmit, to the second device based on determining that the second device has output the portion of the content item associated with the event, the message.

15. The apparatus of claim 14, wherein the processor executable instructions, when executed by the one or more processors, further cause the apparatus to receive, from the first device, data indicating a user account associated with the second user, wherein the user account indicates one or more devices associated with the second user.

16. The apparatus of claim 15, wherein the processor executable instructions, when executed by the one or more processors, further cause the apparatus to transmit, to the second device, a link to the content item.

17. The apparatus of claim 14, wherein the processor executable instructions that, when executed by the one or more processors, cause the apparatus to determine, based on the current position of the content item being output and based on the position of the event, that the second device has output the portion of the content item associated with the event further cause the apparatus to poll, based on receiving the communication, the second device.

18. The apparatus of claim 15, wherein the processor executable instructions, when executed by the one or more processors, further cause the apparatus to determine, based on a device identifier, the second device from the one or more devices associated with the second user.

19. The apparatus of claim 14, wherein the processor executable instructions, when executed by the one or more processors, further cause the apparatus to transmit, to the second device, the content identifier, wherein the second device causes output of an indication of the content item based on the content identifier.

20. The apparatus of claim 14, wherein the processor executable instructions, when executed by the one or more processors, further cause the apparatus to receive an indication that the second device is causing output of the content item associated with the content identifier.

* * * * *